United States Patent [19]

Magnotte

[11] 4,395,180

[45] Jul. 26, 1983

[54] ENGINE UNIT MAINTENANCE COMPLEX

[75] Inventor: John A. Magnotte, La Mirada, Calif.

[73] Assignee: Westmont Industries, Santa Fe Springs, Calif.

[21] Appl. No.: 186,970

[22] Filed: Sep. 15, 1980

[51] Int. Cl.³ .......................... B65G 1/06; B66C 7/14
[52] U.S. Cl. ..................................... 414/282; 104/98; 104/127; 212/208
[58] Field of Search ............... 414/266, 267, 277, 279, 414/281, 282, 284; 212/208, 73; 104/96, 98, 127–129, 131, 250, 252

[56] References Cited

U.S. PATENT DOCUMENTS

| | | | |
|---|---|---|---|
| 3,132,598 | 5/1964 | Pearson | 104/98 |
| 3,561,365 | 2/1971 | Rooklyn | 104/127 |
| 3,786,942 | 1/1974 | Dane | 414/266 |

*Primary Examiner*—Robert G. Sheridan
*Attorney, Agent, or Firm*—Beehler, Pavitt, Siegemund, Jagger & Martella

[57] ABSTRACT

A facility for maintaining and servicing multiple units of equipment such as jet engines, after removal from an aircraft by conventional procedures, makes use of a multiple number of service bays serving as maintenance stations disposed on opposite sides of a central delivery way. An under hung bridge crane travels back and forth throughout the length of the central delivery way. Screw jacks at four corners of the crane are attached to and operate to elevate and lower a twin rail lifting bridge on which a jet engine unit is slung. The unit is supported by fixtures attached to trolleys which roll on the twin bridge rails. There is a mating twin rail lifting bridge in each bay with which the lifting bridge of the crane can temporarily interlock, so that the engine unit can be pushed on its trolleys from one lifting bridge to the other. Four corner located screw jacks also lift and lower the lifting bridge in each bay. Additionally at each of the four corner locations of the lifting bridge on the crane as also on the lifting bridge for each bay there is a sliding vertical guide assembly operable during all lifting and lowering operations of the respective lifting bridge to insure lateral stability.

18 Claims, 17 Drawing Figures

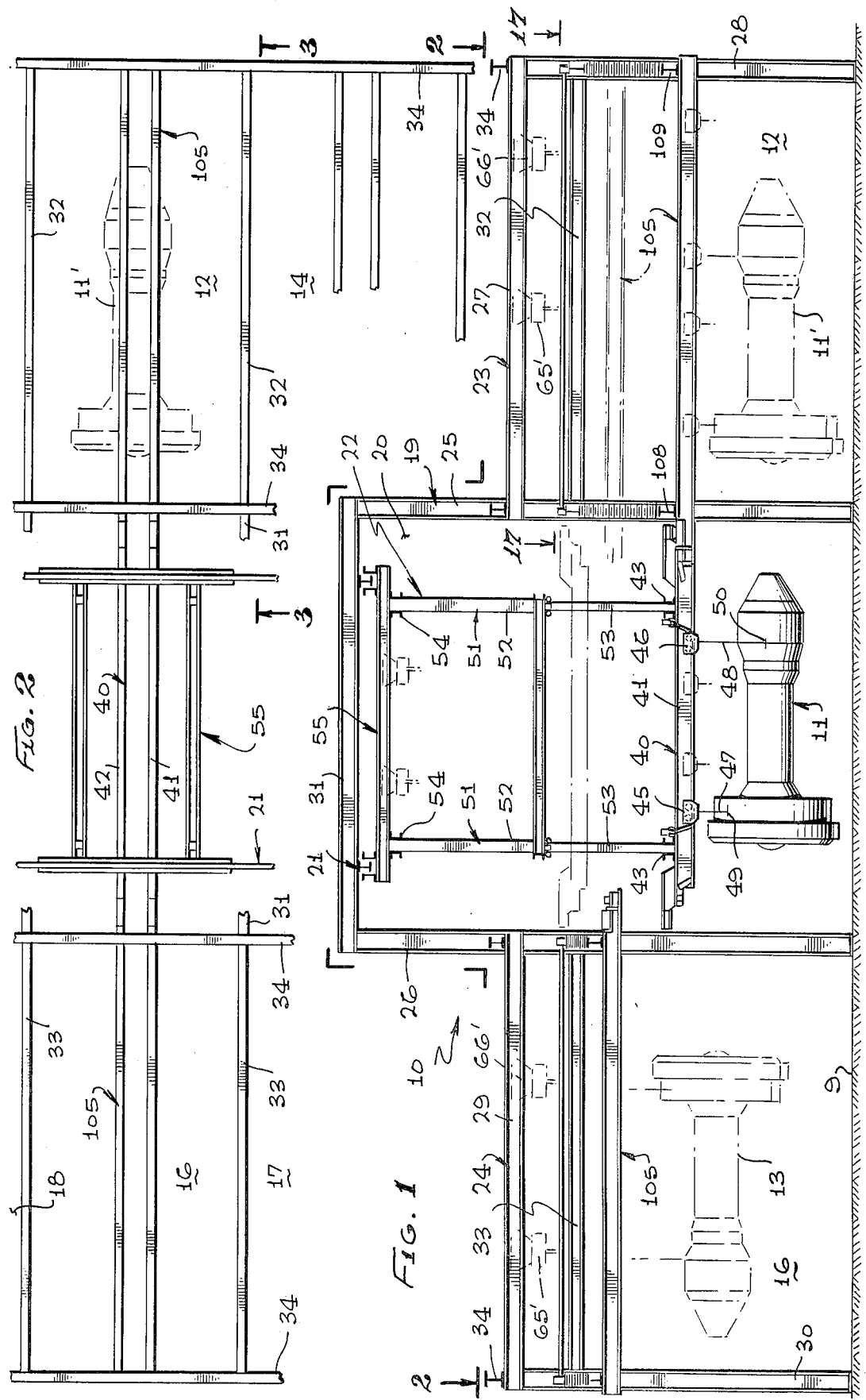

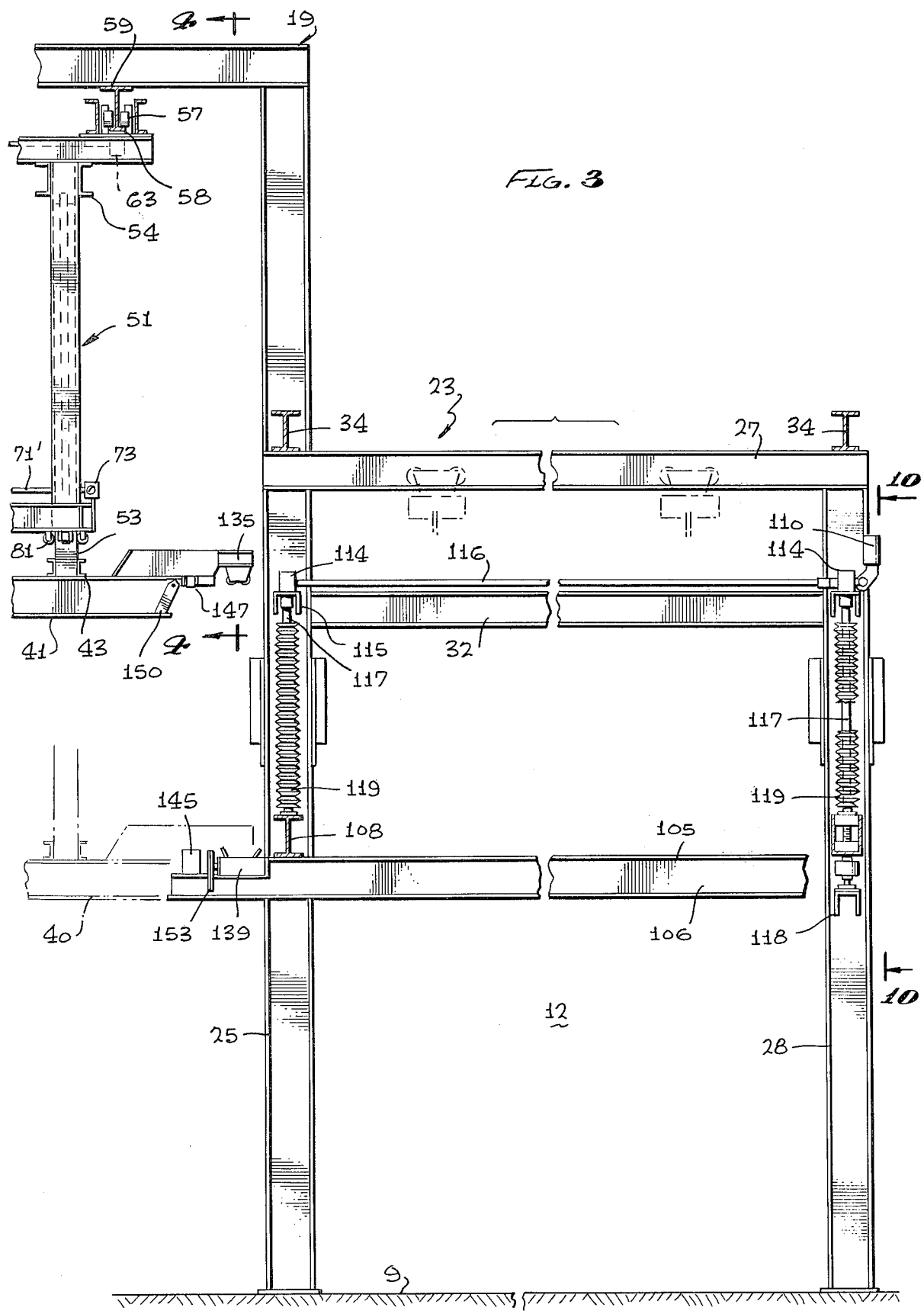

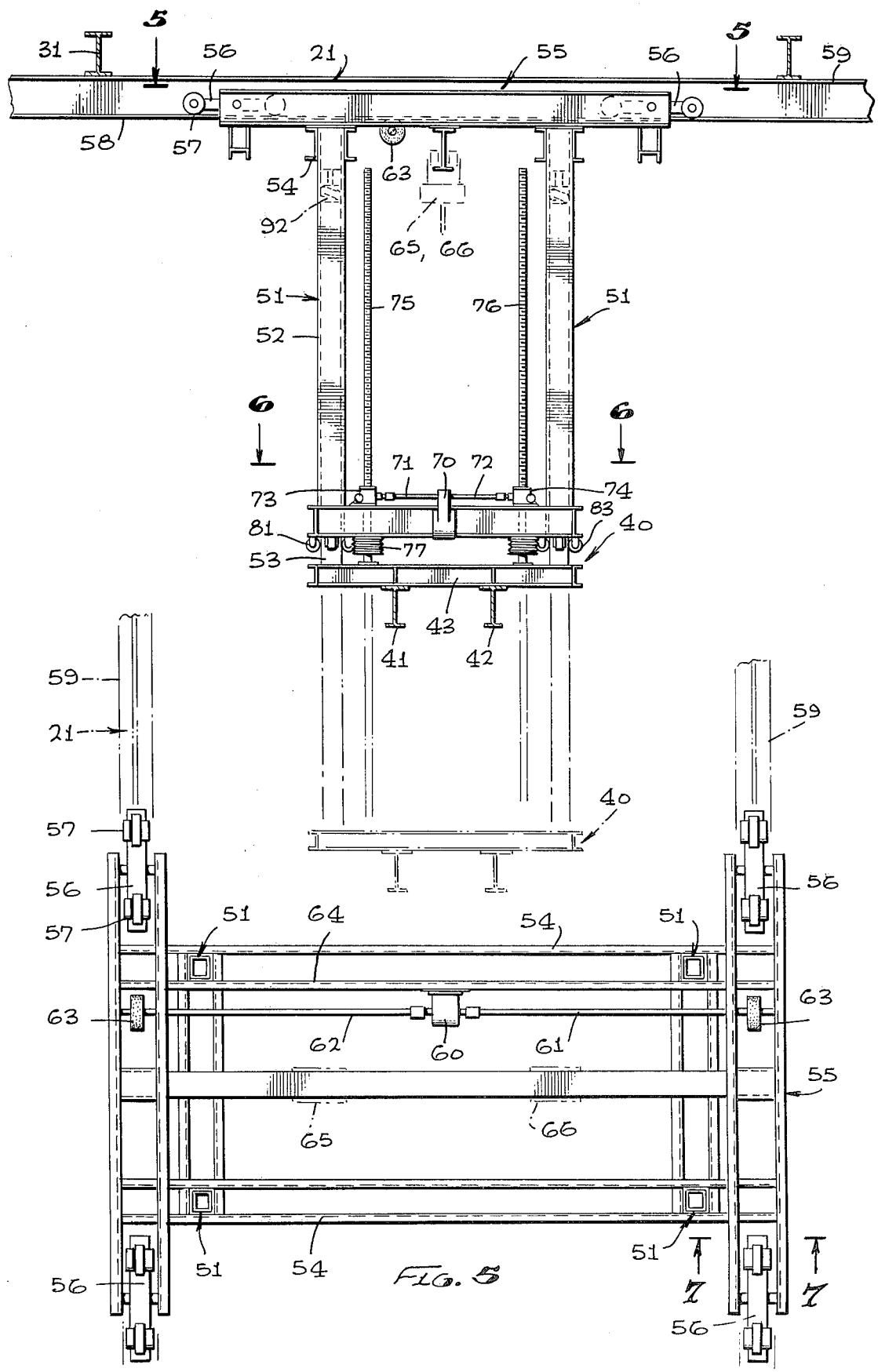

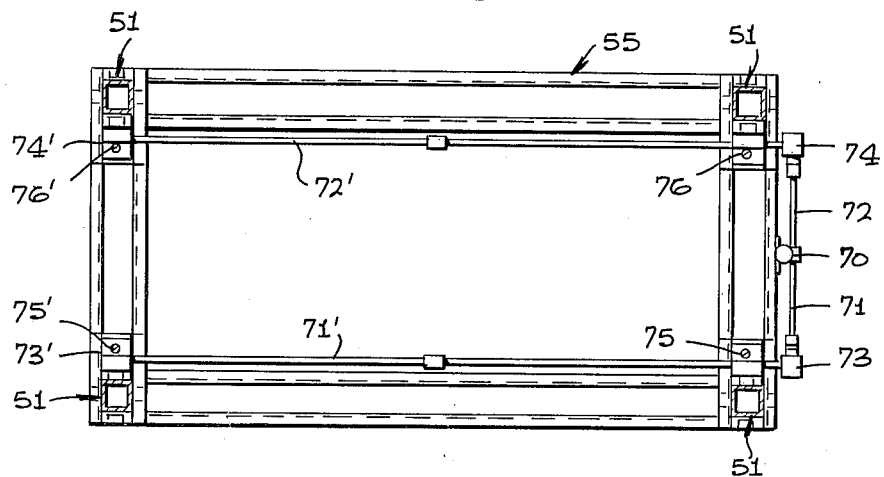
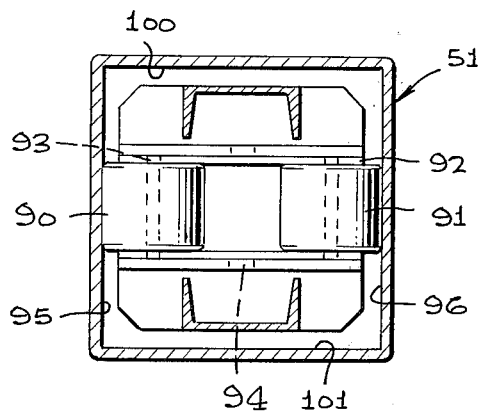
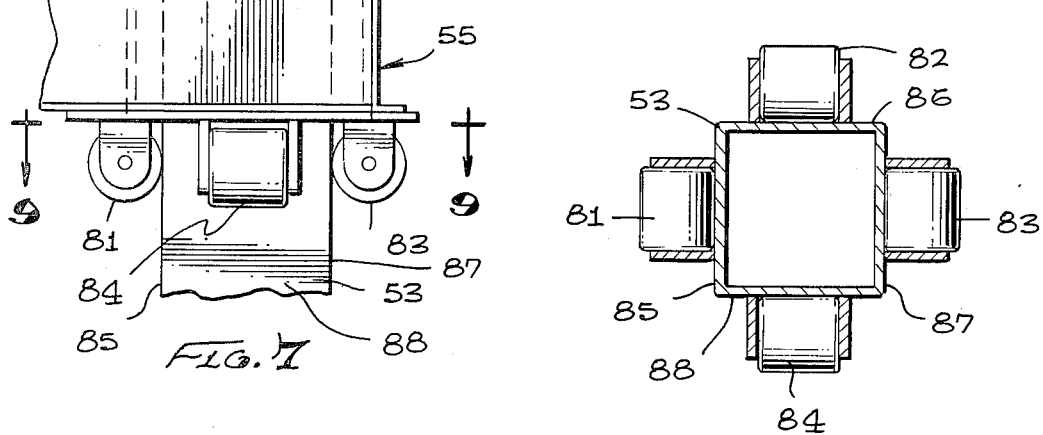

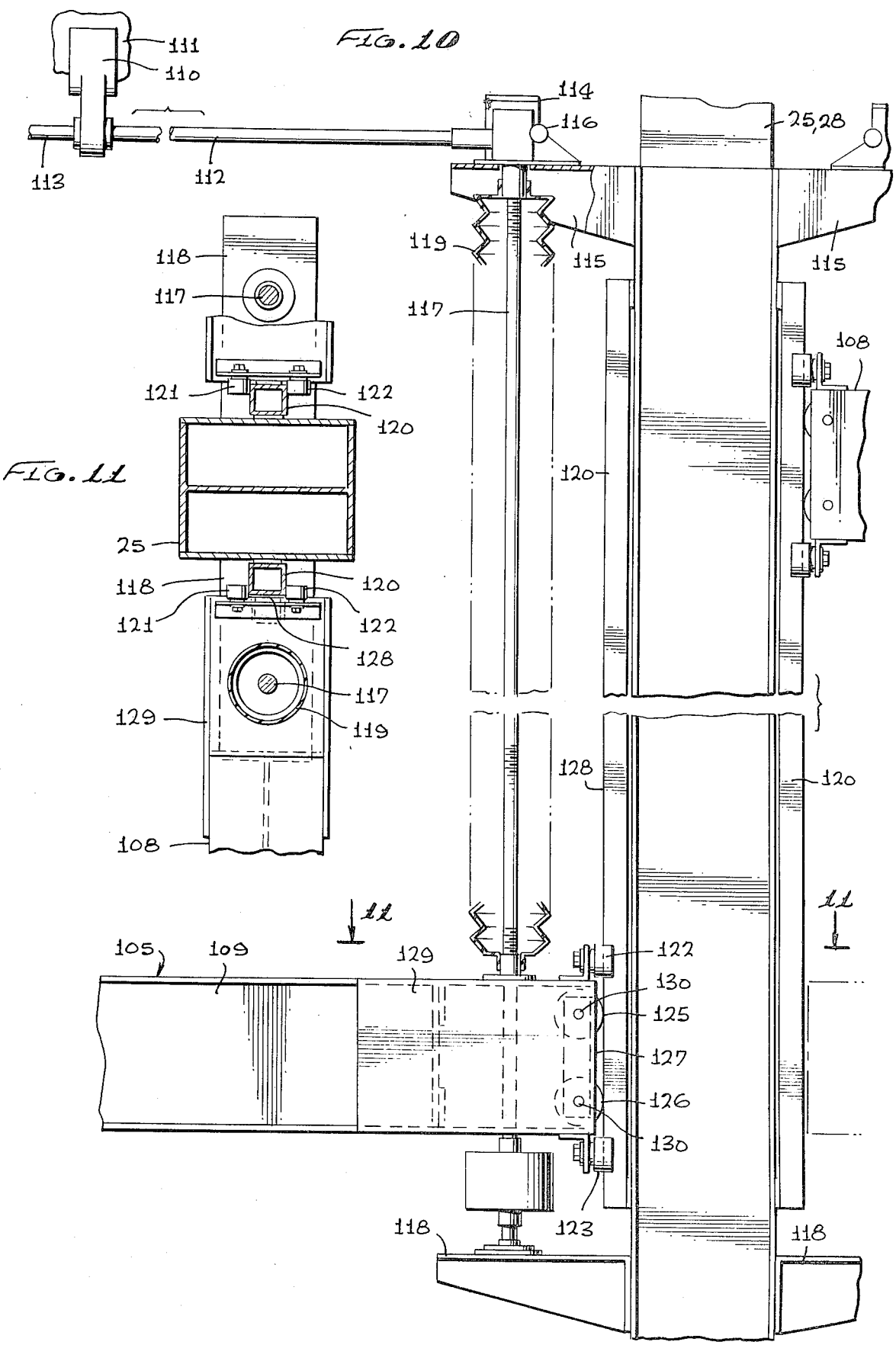

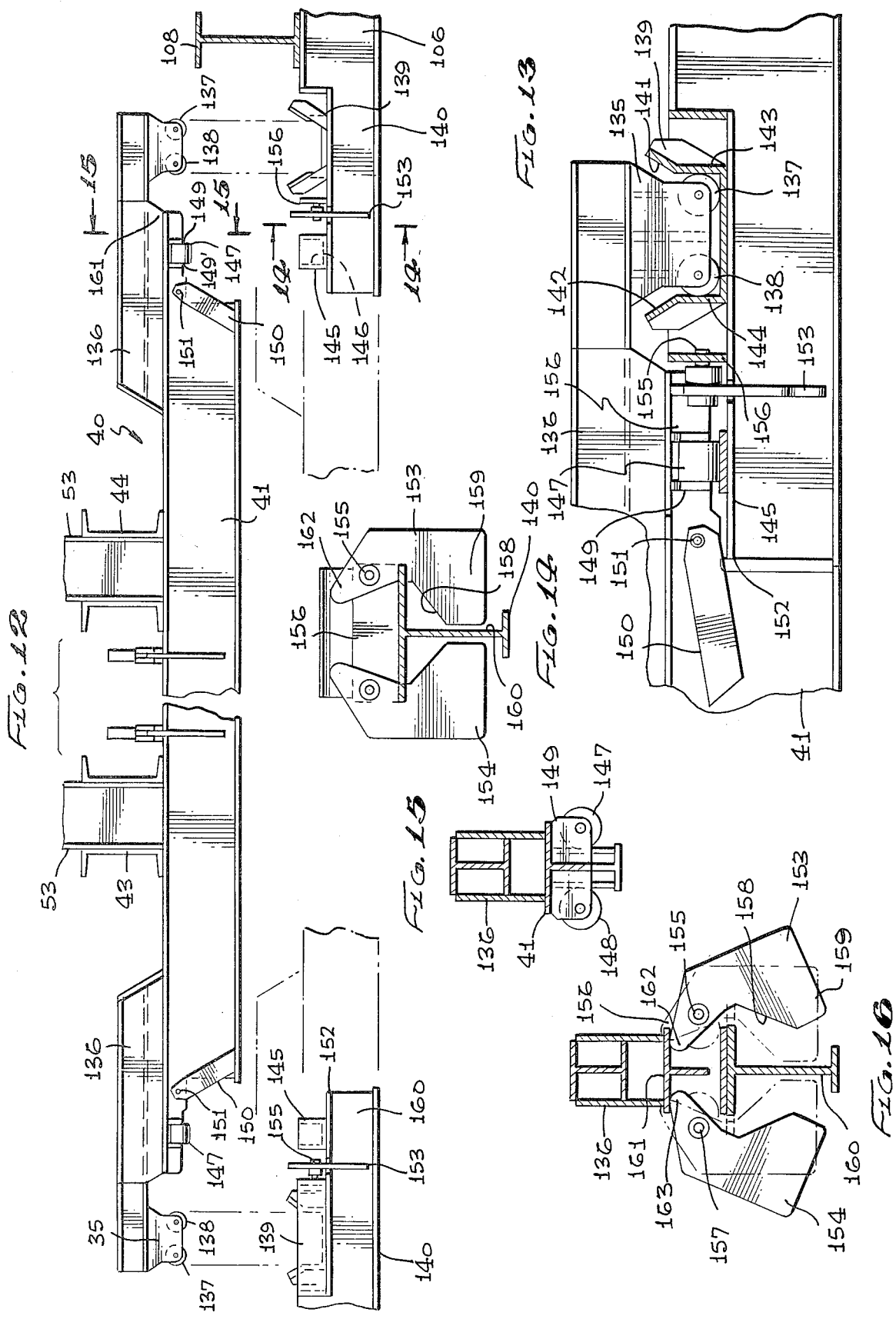

ENGINE UNIT MAINTENANCE COMPLEX

In the maintenance of jet engine units, especially those in service on aircraft, skillful, precise and dependable workmanship is in constant demand. The demands of the airline industry are also such that maintenance and service work may often, of necessity need to be performed on full 24 hour day schedules throughout all seasons of the year and regardless of what the climate may be where the facility is located.

For skilled men to work effectively and efficiently the facility needs to be easy to get around in, free of frame work and structure which could obstruct the easy transfer of units to be serviced from one location to another and of such a nature that multiple service units are available at all times for the performance of different operations such as disassembly, reassembly, reworking, rebuilding, repairing and general servicing, with a minimum need for shifting the engine unit around to various different locations.

Although sundry types of shops have long been used to perform the various maintenance and servicing operations, such shops have been for the most part facilities commenced with a limited number of stations which have been added to step by step, as the need has increased, with some stations suited to certain operations and not others.

As a result there has been considerable wasted time and lost motion causing costly delays and inefficient overall performance. More engines therefor have remained on the ground which would otherwise be aloft and in service.

It is therefore among the objects of the invention to provide a new and improved engine unit maintenance complex which is systematically arranged in a manner such that a transporting vehicle can pick up an engine unit, deliver the unit to any one of a number of service bays and then quickly travel to another such bay for pick up of a partly or completely overhauled unit for delivery to another service bay for a different operation, or for return to the loading station.

Another object of the invention is to provide a new and improved engine unit maintenance complex in such an arrangement and of such proportions as to enable performance of a wide variety of service operations such as disassembly, reassembly, reworking, rebuilding, repairing and general servicing, without need for transferring the unit to some other facility.

Another object of the invention is to provide, in an engine unit maintenance complex a new and improved traveling lift crane of construction such that the engine unit is carefully balanced at all stages of travel, whether being lifted, lowered or transported from one location to another.

Still another object of the invention is to provide in an engine unit complex a new and improved lift crane structure and service bay arrangement such that bridge rails, which carry the engine unit on the crane match corresponding rails in the service bay in a manner assuring safety in transportation of the engine unit, delivery to the service bay, manipulation at the service bay and ultimate return of the engine unit to the crane.

Still further included among the objects of the invention is to provide an engine unit maintenance complex which, while being a positive, balanced and well ordered arrangement, is also of a structural and operative design calculated to embody a low cost of construction and substantially a minimum of operating expense.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

FIG. 1 is a front elevational view of the engine unit maintenance complex taken from the end at which engine units are delivered for loading into the complex.

FIG. 2 is a fragmentary plan view on the line 2—2 of FIG. 1.

FIG. 3 is an enlarged elevational view of one of the service bays taken on the line 3—3 of FIG. 1.

FIG. 4 is a partial side elevational view of the traveling bridge lift crane taken on the line 4—4 of FIG. 3.

FIG. 5 is a plan view of the traveling bridge lift crane with a fragment of the supporting frame taken on the line 5—5 of FIG. 4.

FIG. 6 is a cross sectional view of the bridge lift crane taken on the line 6—6 of FIG. 4.

FIG. 7 is an enlarged fragmentary elevational view of the bridge lift crane taken on the line 7—7 of FIG. 5.

FIG. 8 is a cross sectional view on the line 8—8 of FIG. 7.

FIG. 9 is a cross sectional view on the line 9—9 of FIG. 7.

FIG. 10 is a fragmentary elevational view at one corner of one of the service bays showing mounting and support of the corresponding twin rail structure taken on line 10—10 of FIG. 3.

FIG. 11 is a cross sectional view on the line 11—11 of FIG. 10.

FIG. 12 is side elevational view of the twin rail structure of the lift bridge crane showing interlocks with the twin rails of adjacent service bays in unlocked position.

FIG. 13 is a fragmentary elevational view of one of the interlocks of FIG. 12 in interlocked position.

FIG. 14 is a cross sectional view on the line 14—14 of FIG. 12 with locks in lock-on position.

FIG. 15 is a cross sectional view on the line 15—15 of FIG. 12.

FIG. 16 is a cross sectional view similar to FIG. 14 but with locks in unlocked position.

Figure 17:
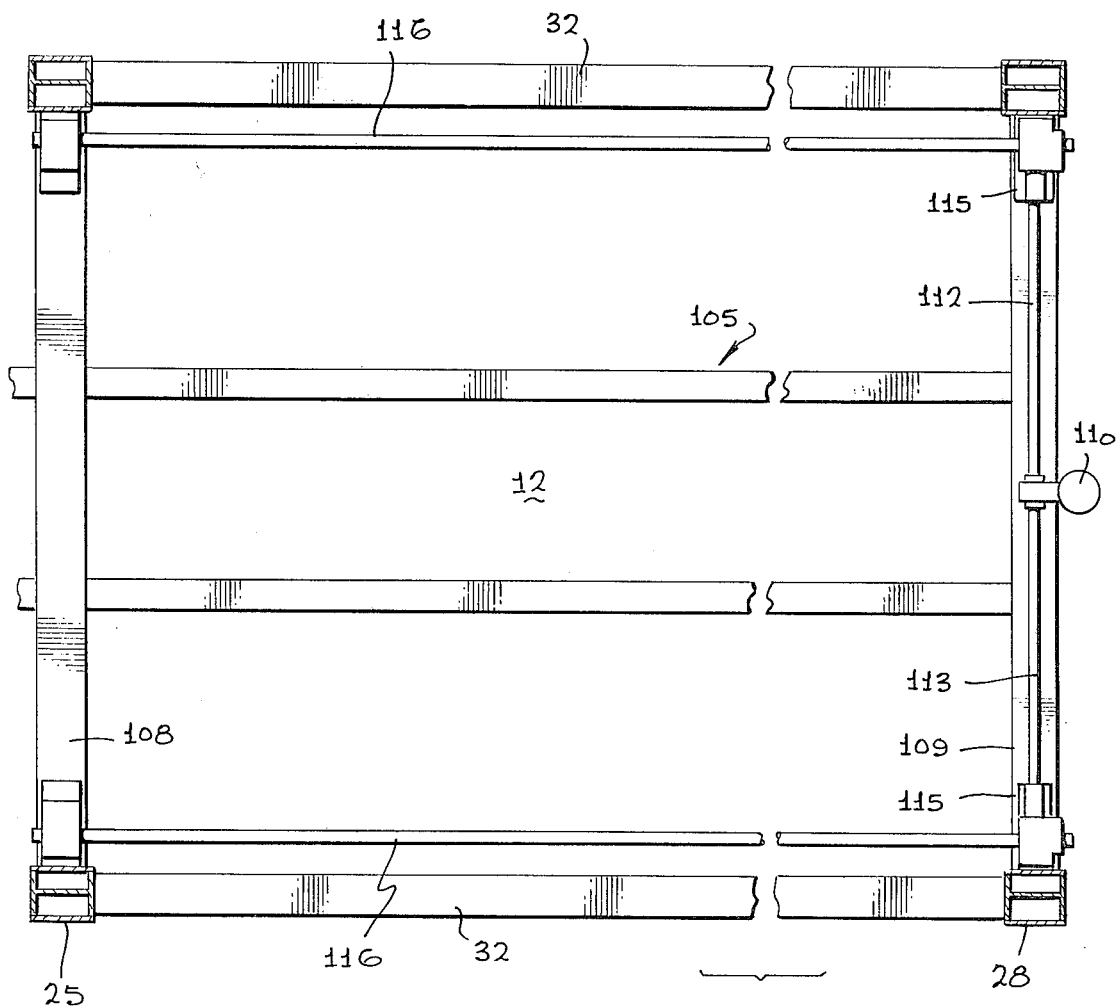
FIG. 17 is a partial plan view of one of the service bays on the line 17—17 of FIG. 1.

In an embodiment of the invention chosen for the purpose of illustration there is shown in FIG. 1 an elevational view of the engine maintenance complex 10, as viewed from one end, showing by way of example a jet engine 11 in solid lines at a location ready for delivery to the broken line location 11' in a right hand service bay 12. Another jet engine 13 is shown already located in a left hand service 16. The complex is adapted to handle the engine as a unit with or without any one or more of its component parts. It should be understood that on the right hand side there may be a multiple number of service bays, as for example like service bays 12 and 14 shown in FIG. 2, with a total number of which is optional but of which four may be considered a workable number. Similarly on the left hand side are a comparable multiple number of service bays as suggested by the service bays 16, 17 and 18, all being on a level support surface 9.

Centrally disposed in FIG. 1 is a main frame 19 within which is a delivery way 20 to accomodate an overhead transportation rail system 21 along which travels a bridge lift crane 22. To the right of the main frame is a service frame 23 which is the structure forming the service bay 12 and to the left is a service frame 24 which is the structure forming the service bay 16. The service frames as noted share some of the main frame 19. For example the main frame has side columns 25 and 26, the side column 25 being shared by the service frame 23 for support of a beam 27 which is supported at its opposite end by a service column 28. Similarly the side column 26 supports a beam 29 which is supported at its opposite end by a side column 30. A beam 31 spans the delivery way 20, extending from the tops of the side columns 25 and 26. In addition to the beam 27 for the service bay 12 is a second lower stiffening beam 32, there being a comparable stiffening beam 33 for the service bay 16. Longitudinally extending beams are shown by the reference characters 34.

For actually supporting the jet engine unit 11 there is provided a transportation bridge 40 in the form of a twin rail lifting bridge which consists in the main of two spaced parallel rails 41 and 42, further details being shown in FIGS. 4 and 5. The rails are supported in spaced relation by transverse beams 43, thereby providing a substantially rigid rectangular structure. An under hung bridge crane is preferred. Other types such as Top Rider or monorail may be substituted.

Trolleys 45 and 46 roll on lower flanges of the rails 41 and 42 in a manner allowing them to be pushed by hand. Extending downwardly from the trolleys 45 and 46 are fixtures 47 and 48 which fasten to appropriate support points 49 and 50 on the engine unit itself, when the engine unit has been delivered to a loading station (not shown) for the maintenance complex, at one end or the other of the delivery way 20. Other trolleys shown at various locations are used for engine disassembly and reassembly.

At each of four locations with respect to the twin rail lifting bridge there is provided a substantially identical telescoping tube 51, of optional cross section shape, a square shape shown, and consisting in the main of an outer telescoping member 52 at the upper end and an inner telescoping member 53 at the lower end. At the base the lower telescoping member is anchored to the transportation bridge rails 40 by appropriate conventional means as for example by weldments to the transverse beams 43. The top of the upper telescoping member is in turn anchored to appropriate channel sections 54 by conventional means, the channel sections 54 being anchored to a carriage 55. Traction assemblies 56 at the four corners of the carriage 55 provided with appropriate wheels 57 carry the carriage 55 along the lower flange 58 of a beam 59, serving as part of the overhead rail transportation system 21.

For driving the carriage throughout the delivery way there is provided a motor 60, see FIG. 5, drive-shafts 61 and 62 of which have mounted at the outer ends a friction wheel 63, the friction wheel having a rolling engagement with the underside of the lower flange 58 of the beam 59, on each side, see FIGS. 3 and 4. The motor 60 is mounted on and carried by a strut 64 extending transversely of the carriage 55. As a convenience auxiliary hoists 65 and 66 are provided on the carriage 55 to assist, for example, in the loading and unloading of the engine units 11. Other auxiliary hoists 65' and 66' are conveniently located above the engine position in the various service bays.

For lifting and lowering the transportation bridge 40 a system of screwjacks is made use of, a screwjack being operable at each of the four corners of the transportation bridge. For operation of the screwjacks there is provided a gear motor 70, see FIG. 4, from which extends drive shafts 71 and 72. The drive shafts are in operable engagement respectively with gearboxes 73 and 74. The gearbox 73 serves to lift and lower a rod 75, the lower end of which is attached to a corresponding corner of the transportation bridge 40. Similarly a rod 76 is operated by the gearbox 74 and is attached to another corresponding corner of the transportation bridge 40. Accordion pleated dust jackets 77 may be employed for the lower ends of the rods 75 and 76. A gear box 73' for one of the other corners which operates a rod 75' is driven by a shaft 71' from the gearbox 73. Another gear box 74' for the other corner which operates a rod 76' is driven by a drive shaft 72' from the gearbox 73, see FIG. 6. Equipped in this fashion, all four corners of the transportation bridge are lifted and lowered simultaneously thereby keeping the transportation bridge in balance, whether or not loaded with one of the engine units 11. Instead of gear box arrangement lifting expedients such as air cylinders, hydraulic cylinders or a cable winch can be used.

To make certain that the inner and outer telescoping members 52 and 53 operate smoothly irrespective of an unbalanced load on the transportation bridge 40, guide means are provided. One such means consists of four rollers 81, 82, 83, and 84 in rolling engagement with, respectively four faces 85, 86, 87, and 88 of the lower telescoping member 53 at each corner. The rollers are mounted and carried by the carriage 55.

There is a second guide means for each pair of telescoping member located interiorly and adjacent the top of the inner telescoping member 53, see FIGS. 7 and 8. One pair of rollers 90 and 91 are supported at opposite ends of a bar 92 on axles 93. Initially the bar is pivotally supported at a point 94 on respective side faces 86 and 88 of the lower telescoping member 53. Once adjusted in smooth rolling engagement at opposite ends with side faces 95 and 96 of the outer telescoping member 52, the bar is welded in position by appropriate conventional technique.

There is a second pair of rollers 97 on a bar 99 mounted in a similar fashion to roll against faces 100 and 101 of corresponding sides of the outer telescoping member 52. The bar 99 is adjusted and welded in a similar fashion.

The service bays for each of the maintenance stations are somewhat similarly constructed for lifting and lowering a service bridge 105 when it has been loaded with one of the engine units as shown in broken lines 11' in FIGS. 1 and 2. The service bridge 105 is of similar construction, consisting of rails 106 supported in spaced parallel relationship by transverse beams 108 and 109.

For lifting and lowering the service bridge 105 there is provided a screwjack arrangement similar to that shown and described for lifting and lowering the transportation bridge 40. For this purpose there is provided a gear motor 110 mounted upon a stationary portion 111 of the service frame 23, and which may for example be a strut extending between adjacent columns 25 or 28. Driveshafts 112 and 113 extend from the gear motor 110 for operating gearboxes 114 on brackets 115 attached to one or another of the columns as shown in FIG. 10, there being a gear box 114 at each of four corner locations. An extension driveshaft 116 for example is shown in FIG. 3, extending from the left hand gearbox 114 adjacent the column 25 to the right hand gearbox 114 adjacent the column 28. In each instance a vertically extending rod 117 engaged by the gearbox 114 is supported upon a bracket 118 on the same column as is the bracket 115. By having the rod 117 mounted in conventional threaded engagement with a corner box 129 of the service bridge 105, rotation of the rod by operation of the motor 110 is adapted to lift and lower the service bridge, at each corner, in a synchronized relationship at all times. An accordion pleated dust jacket 119 may be employed to protect the threaded central portion of each rod 117. The gear motor, gearboxes, driveshafts and rods are substantially conventional and currently commercially available. Here also air or hydraulic cylinders or a cable winch can be employed instead of the gearbox arrangement.

To guide the service bridge 105 throughout its travel there is provided on each of the columns a vertically extending guide strip 120, as shown advantageously in FIGS. 10 and 11. A guide strip is supplied at each of the four corners of the service bridge 105 on the appropriate vertical column. Two-way guide means is provided at each corner location of the service bridge, to cooperate with the respective vertically extending guide strip 120. For example there is an upper pair of oppositely disposed rollers 121 and 122 adjacent the upper edge of the transverse beam 108 which engage opposite side faces of the guide strip 120. Another pair of such rollers 123 are located on the lower side of the transverse beam 108. In edgewise disposition are rollers 125 and 126 at opposite ends of a bar 127 for rotation about axles 130. The rollers 125 and 126 roll against an adjacent edge face 128 of the guide strip 120.

When the engine unit 11 is to be transferred from the transportation bridge 4 to one or another of the service bridges 105 the bridges must be in longitudinal alignment, as shown in FIGS. 12 and 13, and in part by the broken lines for service bridge 40 in FIG. 3. When in transfer alignment, there is also an interlock between the bridges, the interlock structure being shown in FIGS. 12 and 13. For this purpose each of the rails 41 and 42 carries at opposite ends a bracket 135 supported on a projection structure 136 on the upper side of the rail. Rotatably mounted adjacent the lower edge of the bracket 135 are rollers 137 and 138.

When the rails are in aligned and interlocked position the rollers 137 and 138 are adapted to nest within a box 139 mounted on a projecting portion 140 of the rail 106. Ramps 141 and 142 at opposite sides of the box 139 are directed inwardly toward the bottom of the box and respective opposite vertical walls 143 and 144, see FIG. 13.

For alignment in the transverse direction there is provided another box 145, having a pocket 146 within which rollers 147 and 148 are adapted to nest. The rollers 147 and 148 are mounted on brackets 149 and 149' on the respective rail 41. By virtue of the boxes and the respective sets of rollers, rails 41 and 106 as well as the respectively parallel rails 42 and 107, when in alignment, are interlocked both longitudinally and transversely in that alignment.

Prior to the interlocking relationship being accomplished and more particularly of value when there is an engine unit being supported by the transportation bridge 40, obliquely disposed safety guards in the form of engine position stops 150 are in the operative position shown in FIG. 12. The stops 150 are pivotally hung adjacent the upper edge of the rail 41 by means of a pivot pin 151. When the stops are in this position the trolleys 45 and 46 cannot be pushed off the rail. Additional engine position stops are used to center the load when traveling. During lowering of the rail 41, for example, from the position of FIG. 12 to the interlock position of FIG. 13, a corner 152 of the projection 140 of the rail 106 presses against the stop 150 and tilts it in a clockwise direction as shown in FIG. 13 to a position clear of the lower edge of the rail 41. Upon removal of the rail 41 from the interlock position, to the position of FIG. 12, the stop 150 automatically drops to its lowered position.

There is a second safety guard arrangement for each of the rails 106 and 107 of the service bridge, at the end of the rails where they are to be interlocked. The second safety guard here shown consists in each instance of engine stops in the form of a pair of pivoted plates 153 and 154. The plate 153 is pivotally mounted by means of a pivot pin 155 on an appropriate bracket 156 attached to the upper side of the projection 140 of the rail 106. A similar pivot pin 157 pivotally mounts the plate 154 upon the same bracket 156. By reason of providing a cutout 158 for the plate 153 a locking portion 159 of the plate falls to a position adjacent the web 160 of the rail 106 thus blocking travel of any trolleys 45, 46 which may support an engine unit 11 on the service bridge 105, the blocking position being shown in FIG. 14.

When the interlocking relationship between the rails 41 and 106 is being accomplished, a release plate 161 which is part of the projection 136, extends downwardly against fingers 162 and 163 of the respective plates 153, 154 thereby to tilt the plates from the locking positions of FIG. 14 to the solid line release positions of FIG. 16. It follows therefor that when the interlock relationship is accomplished as illustrated in FIG. 13, the shoes 150 are lifted and the plates 153 and 154 are tilted out of blocking position so that there is an unobstructed path of travel between that portion of the transportation bridge and the rails 41 and 42 serving as a transportation track and comparable portions of the rails 106 and 107 acting as a service track. It also follows that when there is disengagement from the interlock position, as shown by the solid lines of FIG. 12, the stops 150 will return to blocking position as will also the plates 153 and 154. Accordingly, should there be an engine unit supported on the rails 41 and 42, it cannot be inadvertantly pushed off. Similarly should there be an engine unit supported by the rails 106 and 107, it cannot be inadvertantly pushed into the delivery way 20.

In operation it follows therefore that an engine unit requiring service of any kind for which the complex is equipped, upon delivery at one end or the other of the delivery way is picked up by the transportation bridge, and preferably with the transportation bridge in the solid line lower position of FIG. 1. The transportation bridge is then lifted to uppermost position as shown by the broken lines after which it is moved lengthwise of the delivery way 20 to a position opposite one or another of the service bays 12, 14 or 15 on one side of the delivery way or corresponding service bays, 16, 17 or 18 on the opposite side. When the service bridge 105 of the service bay is to receive delivery of an engine unit 11 at its delivery end the service bridge will be in the solid line lowered position of FIG. 1. This is the same relationship as shown in FIG. 12. Thereafter the delivery bridge 40 is lowered from the position of FIG. 12 to the solid line interlock position of FIG. 13. When this has been accomplished the engine unit 11 is pushed by hand so that the trolleys 45 and 46 roll from the rails of the delivery bridge 40 to the rails of the service bridge 105, passing the open interlocks as shown in FIG. 16. The lifting bridge is then free for operation either to shift another engine unit from one of the delivery bays to a loading station or, on occasions, to shift an engine unit from one delivery bay to another delivery bay. The interlocking and release operation is available at both ends of the delivery bridge so that the engine unit can be passed to service bays off either side. Safety features operate automatically. The delivery bridge moreover cannot be moved until effective interlocking has been released. Since all of the safety features are effective as a mechanical operation the complex is one which lends itself to a duplicate safety operation provided by an auxiliary electric limit switch interlock system.

While a particular embodiment of the present invention is shown and described, it will be obvious to those skilled in the art that changes and modifications may be made without departing from the invention in its broader aspects, and therefore, the aims of its appended claims are to cover all such changes and modifications as fall within the true spirit and scope of the invention.

Having described the invention, what is claimed as new in support of Letters Patent is as follows:

1. An engine maintenance complex comprising a main frame forming a delivery way having a loading station at one location, service frames forming a plurality of service bays at other locations laterally of the delivery way and a receiving station for the end of each service bay adjacent the delivery way, a transportation rail system on said main frame extending throughout said delivery way, said transportation rail system having a transverse transportation bridge providing a transportation track, horizontally moveable engine support means in travelling engagement with said transportation bridge, a service bridge in each of said service bays adapted to provide a service track for said moveable supports, a plurality of vertically moveable connection means between said service bridge and respective service frame for moving said service bridge vertically between an uppermost position and a lowermost position, and releaseable interconnections at adjacent ends of said service bridge and said transportation bridge adapted for mutual engagement when said bridges are at the same elevation and in longitudinal alignment to enable said moveable supports to pass between said transportation bridge and a selected service bridge.

2. An engine maintenance complex as in claim 1 wherein there is a bridge lift crane having an upper section with a travelling support on said transportation rail system, said bridge lift crane having a lower section, vetically moveable connection means between said lower and upper sections for lifting and lowering said lower section relative to said upper section and to said service bridge in various positions between said uppermost and lowermost positions, said transportation bridge being located on and carried by said lower section.

3. An engine maintenance complex as in claim 2 wherein said overhead transportation rail system comprises a plurality of overhead supporting rails on the main frame extending throughout said delivery way, rolling supports on said upper section in rolling engagement with said supporting rails, a drive motor on said upper section having a drive shaft member extending to a location adjacent at least one of said rolling supports and drive means on said drive shaft member in driving engagement with said one of said supporting rails.

4. An engine maintenance complex as in claim 2 wherein said vertically moveable connection means comprises a motor means on the respective frame and a synchronized drive train between said motor means and each end of the respective bridge whereby to maintain opposite ends of the bridge in the same horizontal plane.

5. An engine maintenance complex as in claim 4 wherein each bridge comprises two spaced parallel track elements, and said vertically moveable connection means comprises a synchronized drive train between said motor means and each end of each track element whereby to maintain said track elements in the same horizontal plane throughout their lengths.

6. An engine maintenance complex as in claim 5 wherein the vertically moveable connection means for at least one of said bridges comprises a pair of respective inner and outer telescoping members for each end of each track element, one telescoping member of each pair being mounted on the bridge and the other telescoping member of each pair being mounted on a stationary portion of the respective frame, and moveable guide means acting between the inner and outer telescoping elements of each pair whereby to hold said telescoping elements in snug sliding relationship.

7. An engine maintenance complex as in claim 5 wherein the vertically moveable connection means for at least one of said service bridges comprises columns forming part of the respective service frame, a vertically extending guide strip on the exterior of each of the columns and pairs of oppositely disposed travelling guides at the ends of the respective service bridge, each pair of travelling guides being in moveable engagement with a corresponding guide strip.

8. An engine maintenance complex as in claim 1 wherein there is a plurality of said service bays on each side of said delivery way, said transportation bridge having a delivery connection at each end, each service bridge having a receiving connection at an end thereof adjacent the delivery way and complementary with respect to the respective delivery connection of the transportation bridge.

9. An engine maintenance complex as in claim 8 wherein the complementary delivery and receiving connections of the respective bridges are brought into engagement by vertical movement of one of said bridges.

10. An engine maintenance complex as in claim 9 wherein the complementary delivery and receiving connections of the respective bridges comprise fixed complementary structural configurations of the respective bridges.

11. An engine maintenance complex as in claim 1 wherein said releasable interconnection comprises oppositely disposed and obliquely directed locking guide means on one of said bridges and complementary locking guide means on the other of said bridges, each said locking guide means being responsive to engagement with the opposite bridge and having a releaseable interlocked engagement when the bridges are in longitudinal alignment.

12. An engine maintenance complex as in claim 11 wherein there is a releaseable safety guard on one of said bridges normally biased to a position adapted to block passage of said moveable supports from one bridge to the other, said safety guard being moveable to release position in response to direct engagement with the other bridge when said bridges are in interlocked engagement.

13. An engine maintenance complex as in claim 11 wherein there is a releaseable safety guard adjacent the end of said transportation bridge and a second releaseable safety guard adjacent the end of the service bridge facing said delivery way, each of said safety guards being normally biased to a position adapted to block passage of said moveable supports from the respective bridge, said safety guards being moveable to release position in response to direct engagement with the other bridge when said bridges are in interlocked engagement.

14. An engine maintenance complex comprising a main frame forming a delivery way having a loading station at one location, service frames forming a plurality of service bays at other locations laterally of the delivery way and a receiving station for the end of each service bay adjacent the delivery way, a transportation rail system on said main frame extending throughout said delivery way, said transportation rail system having a transverse transportation bridge providing a transportation track, horizontally moveable engine support means in traveling engagement with said transportation bridge, a service bridge in each of said service bays adapted to provide a service track for said moveable supports, a plurality of vertically moveable connection means between said service bridge and respective service frame for moving said service bridge vertically between an uppermost position and a lowermost position, and releaseable interconnections at adjacent ends of said service bridge and said transportation bridge adapted for mutual engagement when said bridges are in longitudinal alignment to enable said moveable supports to pass between said transportation bridge and a selected service bridge, a bridge lift crane having an upper section with a travelling support on said transportation rail system, said bridge lift crane having a lower section, vertically moveable connection means between said lower and upper sections for lifting and lowering said lower section relative to said upper section, said transportation bridge being located on and carried by said lower section, said vertically moveable connection means comprising a motor means on the respective frame and a synchronized drive train between said motor means and each end of the respective bridge whereby to maintain opposite ends of the bridge in the same horizontal plane, each bridge comprising two spaced parallel track elements, and said vertically moveable connection means comprising a synchronized drive train between said motor means and each end of each track element whereby to maintain said track elements in the same horizontal plane throughout their lengths, the vertically moveable connection means for at least one of said bridges comprising a pair of respective inner and outer telescoping members for each end of each track element, one telescoping member of each pair being mounted on the bridge and the other telescoping member of each pair being mounted on a stationary portion of the respective frame, and moveable guide means acting between the inner and outer telescoping elements of each pair whereby to hold said telescoping elements in snug sliding relationship, said moveable guide means comprising roller means acting between the inner and outer telescoping elements and other rolling means acting between the upper section and one of said telescoping elements.

15. An engine maintenance complex comprising a main frame forming a delivery way having a loading station at one location, service frames forming a plurality of service bays at other locations laterally of the delivery way and a receiving station for the end of each service bay adjacent the delivery way, a transportation rail system on said main frame extending throughout said delivery way, said transportation rail system having a transverse transportation bridge providing a transportation track, horizontally moveable engine support means in traveling engagement with said transportation bridge, a service bridge in each of said service bays adapted to provide a service track for said moveable supports, a plurality of vertically moveable connection means between said service bridge and respective service frame for moving said service bridge vertically between an uppermost position and a lowermost position, and releaseable interconnections at adjacent ends of said service bridge and said transportation bridge adapted for mutual engagement when said bridges are in longitudinal alignment to enable said moveable supports to pass between said transportation bridge and a selected service bridge, a bridge lift crane having an upper section with a travelling support on said transportation rail system, said bridge lift crane having a lower section, vertically moveable connection means between said lower and upper sections for lifting and lowering said lower section relative to said upper section, said transportation bridge being located on and carried by said lower section, said vertically moveable connection means comprising a motor means on the respective frame and a synchronized drive train between said motor means and each end of the respective bridge whereby to maintain opposite ends of the bridge in the same horizontal plane, each bridge comprising two spaced parallel track elements, and said vertically moveable connection means comprising a synchronized drive train between said motor means and each end of each track element whereby to maintain said track elements in the same horizontal plane throughout their lengths, the vertically moveable connection means for at least one of said bridges comprising a pair of respective inner and outer telescoping members for each end of each track element, one telescoping member of each pair being mounted on the bridge and the other telescoping member of each pair being mounted on a stationary portion of the respective frame, and moveable guide means acting between the inner and outer telescoping elements of each pair whereby to hold said telescoping elements in snug sliding relationship, said outer telescoping elements being non-circular in cross sectional shape and being mounted on said upper section, said inner telescoping sections being of complementary cross sectional shape and being mounted on said lower section.

16. An engine maintenance complex comprising a main frame forming a delivery way having a loading station at one location, service frames forming a plurality of service bays at other locations laterally of the delivery way and a receiving station for the end of each service bay adjacent the delivery way, a transportation rail system on said main frame extending throughout said delivery way, said transportation rail system having a transverse transportation bridge providing a transportation track, horizontally moveable engine support means in traveling engagement with said transportation bridge, a service bridge in each of said service bays adapted to provide a service track for said moveable supports, a plurality of vertically moveable connection means between said service bridge and respective service frame for moving said service bridge vertically between an uppermost position and a lowermost position, and releaseable interconnections at adjacent ends of said service bridge and said transportation bridge adapted for mutual engagement when said bridges are in longitudinal alignment to enable said moveable supports to pass between said transportation bridge and a selected service bridge, said releaseable interconnection comprising oppositely disposed and obliquely directed locking guide means on one of said bridges and complementary locking guide means on the other of said bridges having a releaseable interlocked engagement when the bridges are in longitudinal alignment, said obliquely directed locking guide means facing in a longitudinal direction relative to the long axis of the respective bridge.

17. An engine maintenance complex comprising a main frame forming a delivery way having a loading station at one location, service frames forming a plurality of service bays at other locations laterally of the delivery way and a receiving station for the end of each service bay adjacent the delivery way, a transportation rail system on said main frame extending throughout mentary locking guide means on the other of said bridges having a releaseable interlocked engagement when the bridges are in longitudinal alignment, said obliquely directed locking guide means comprising inwardly facing ramps and said complementary locking guide means comprising a roller assembly having a rollable engagement with said ramps.

18. An engine maintenance complex comprising a main frame forming a delivery way having a loading station at one location, service frames forming a plurality of service bays at other locations laterally of the delivery way and a receiving station for the end of each service bay adjacent the delivery way, a transportation rail system on said main frame extending throughout said delivery way, said transportation rail system having a transverse transportation bridge providing a transportation track, horizontally moveable engine support means in traveling engagement with said transportation bridge, a service bridge in each of said service bays adapted to provide a service track for said moveable supports, a plurality of vertically moveable connection means between said service bridge and respective service frame for moving said service bridge vertically between an uppermost position and a lowermost posi-